United States Patent [19]

Cho

[11] Patent Number: 5,258,827
[45] Date of Patent: Nov. 2, 1993

[54] METHOD FOR ADJUSTING VIDEO SIGNAL GAIN

[75] Inventor: Sung Yong Cho, Suweon, Rep. of Korea

[73] Assignee: Samsung Electronics Co. Ltd., Rep. of Korea

[21] Appl. No.: 827,661

[22] Filed: Jan. 29, 1992

[30] Foreign Application Priority Data

Jan. 29, 1991 [KR] Rep. of Korea .................. 91-1491

[51] Int. Cl.$^5$ ............................................ H04N 9/64
[52] U.S. Cl. ................................ 358/21 R; 358/29; 358/27; 358/10; 358/41
[58] Field of Search .............. 358/21 R, 27, 29, 32, 358/35, 10, 51, 41, 163, 164, 174; 364/571.05

[56] References Cited

U.S. PATENT DOCUMENTS

| | | | |
|---|---|---|---|
| 4,499,488 | 2/1985 | White | 358/51 |
| 4,608,593 | 8/1986 | Miyaji | 358/10 |
| 4,712,187 | 12/1987 | Tamura | 358/51 |
| 5,200,813 | 4/1993 | Jeon | 358/41 |

Primary Examiner—James J. Groody
Assistant Examiner—Sherrie Hsia
Attorney, Agent, or Firm—Sughrue, Mion, Zinn, Macpeak & Seas

[57] ABSTRACT

An apparatus for adjusting video signal gain includes a comparator receiving G color signals on a first input terminal and a selected one or R color and B color signals on a second input terminal, a microcomputer receiving the output of the comparator for generating control and indication signals and a display device for receiving the indication signals from the microcomputer for providing pedestal level and gain adjustment status indications. According to one aspect of the invention, a lens is opened or closed based on control signals generated by the microcomputer so as to prepare the apparatus for pedestal level and gain adjustment. A method for performing preparatory and adjusting steps for each of the R color and B color signals is also disclosed. According to the present invention, the gain adjustment can be carried out simply and conveniently without requiring a separate apparatus.

9 Claims, 3 Drawing Sheets

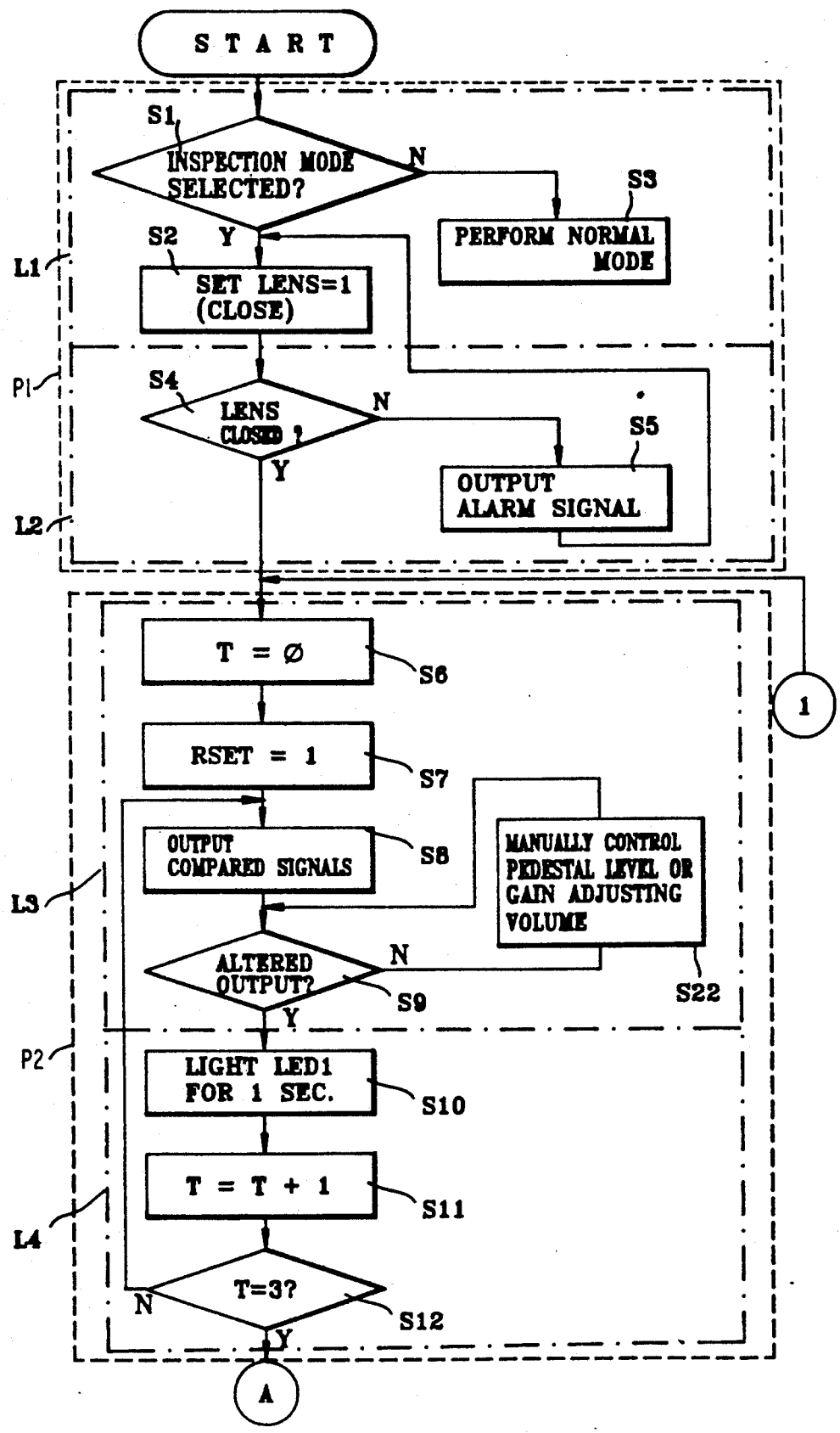

METHOD FOR ADJUSTING VIDEO SIGNAL GAIN

FIELD OF THE INVENTION

The present invention relates to video signal processing system, and more particularly to, a method for adjusting video signal gain in which pedestal level and gain of R(Red) and B(Blue) color signals can be adjusted in reference to G(Green) color signals simply without any separate apparatus.

BACKGROUND OF THE INVENTION

Generally, in a video signal processing apparatus such as a video camera, a television and the like, there is provided an automatic gain adjusting circuit inside, so that gain of input video signals can be automatically controlled. That is, if the level of the video signals is below that of reference signals, then the signals are output after being amplified. On the other hand, if the level of the video signals exceeds that of the reference signals, the signals are controlled so that the output level can be maintained at an even level in order to prevent distortions occurring during amplification.

However, in the case that the automatic gain adjusting apparatus is out of order, or the gain does not show a proper value, there is the problem that a separate gain adjusting apparatus is required to adjust the gain to the desired level again.

SUMMARY OF THE INVENTION

The present invention overcomes the above described disadvantage of the conventional technique and provides an apparatus for adjusting video signal gain and method thereof, in which R and B color signals can be respectively adjusted in reference to G color signals so as to adjust pedestal level and gain simply.

A video signal gain adjusting apparatus according to the present invention includes a comparing circuit for comparing R or B color input signals via a test probe with G color signals, which are input separately and generating controlled output signals, a microcomputer (hereinafter, termed "MICOM") connected to the output of the comparing circuit for adjusting the pedestal level and gain in accordance with the output signals of the comparing circuit, and a display circuit connected to the output of the MICOM for displaying the MICOM state adjusted by the MICOM.

An adjusting method for the video signal gain adjusting apparatus according to the present invention includes a pedestal adjustment preparing step for controlling a lens to be closed according to the selection of an inspection mode, an R color signal adjusting step for adjusting and displaying R color signals subsequently, a B color signal adjusting step for adjusting and displaying B color signals after adjusting the B color signals, and a gain adjustment preparing step for controlling the lens to be opened to adjust a gain subsequently.

BRIEF DESCRIPTION OF THE DRAWINGS

The above objects and other advantages of the present invention will become more apparent by describing in detail the preferred embodiment of the present invention with reference to the attached drawings in which:

FIGS. 2A and 2B are a flow chart of the control method for the appartus for adjusting video signal gain according to the present invention.

DESCRIPTION OF THE PREFERRED EMBODIMENT

Figure 1:
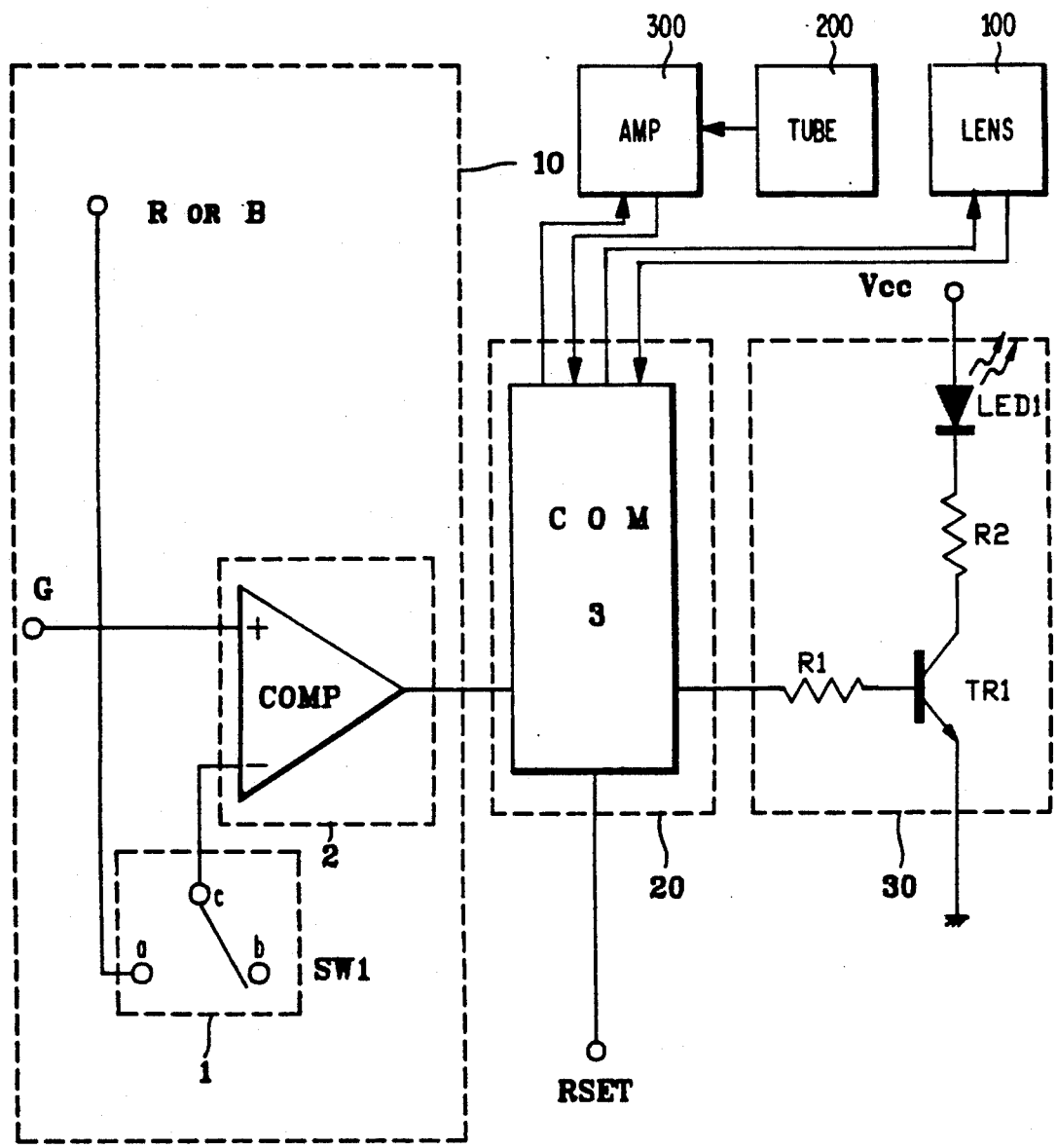
FIG. 1 is a circuit diagram of an apparatus for adjusting video signal gain according to the present invention.

FIG. 1 is a circuit diagram of an apparatus for adjusting video signal gain according to the present invention, comprising a comparing circuit 10, a MICOM 20, and a display circuit 30.

The comparing circuit 10 includes a switch 1 connected to a test probe (connected to an R or B terminal) for selecting normal and control modes and a comparator 2, which has an inverting terminal connected to a common terminal of the switch 1, for comparing G color signals with R or B color signals provided through the test probe under during the control mode, after receiving the R and B color signals through the switch 1.

The MICOM 20 is connected to the output side of the comparator 2 so as to adjust the pedestal level and gain in accordance with the output signals of the comparator 2, and the display circuit 30 is connected to the output side of the MICOM 20 so as to display a state produced as a result of the control by the MICOM 20. MICOM 20 advantageously is also connected to a lens 100 for providing signals for opening and closing lens 100 and an amplifier circuit 300 receiving video signals from an image tube 200 for providing pedestal and gain adjust signals.

The display circuit 30 includes a transistor TR1 which is turned on upon receiving a logic "H" signal from the MICOM 20, and a light emitting diode LED1 which is lighted when the transistor TR1 is turned on.

In the drawing, reference codes R1 and R2 indicate biasing resistors.

Figure 2B:
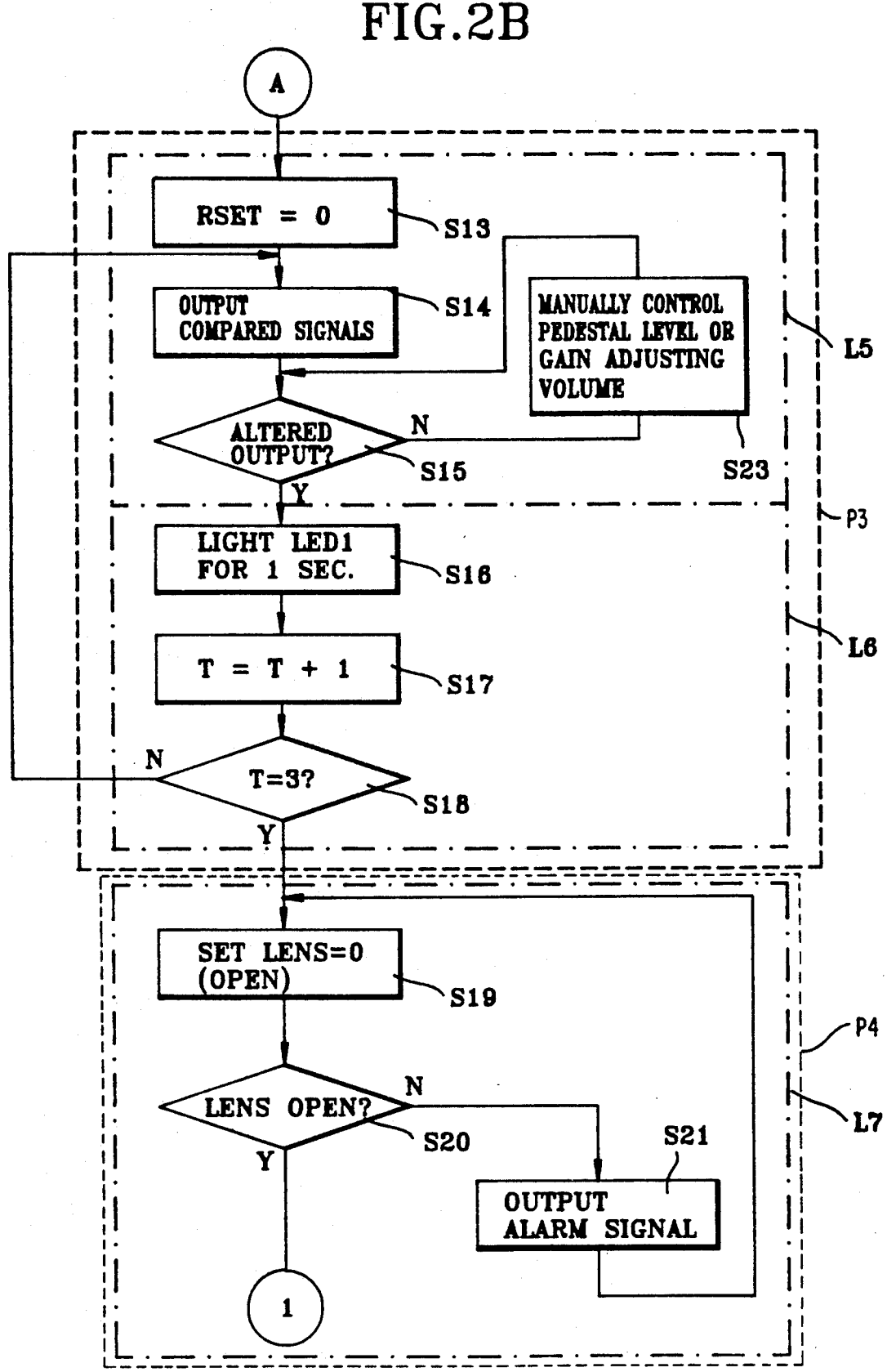

FIGS. 2A and 2B are flow charts showing the constitution of the control method for the video signal gain adjusting apparatus according to the present invention, including a pedestal adjustment preparing step P1, R color signal adjusting step P2, a B color signal adjusting step P3 and a gain adjustment preparing step P4.

The pedestal adjustment preparing step P1 includes an initial routine L1 and a pedestal preparatory routine L2. The initial routine L1 includes a discriminating substep S1 for discriminating whether an inspection mode has been selected, a substep S2 for setting lens flag to "1" to close the lens if the inspection mode is selected at the discriminating substep S1, and a substep S3 for executing the normal operating mode when the inspection mode is not selected.

The pedestal preparatory routine L2 includes a discriminating substep S4 for discriminating whether the lens has been closed after the execution of the substep S2 of the routine L1, and a substep S5 for producing an alarm upon finding the lens 100 open during the substep S4. If the lens 100 has been closed at the discriminating substep S4, the R color signal adjusting step P2 is performed, which includes an R color signal comparing routine L3 and an R color signal displaying routine L4.

The R color signal comparing routine L3 includes a substep S6 for initializing a counter to count the lightings of a light emitting diode LED1, a substep S7 for setting "RSET" to "1" in the MICOM and selecting R color signals in order to adjust R color signals after the execution of the substep S6, a substep S8 for comparing the R color signals with the G color signals and outputting value of the compared signals after the execution of the substep S7, a discriminating substep S9 for discriminating whether an alteration has occurred in the output after the execution of the substep S8 and a substep S22 for manually controlling pedestal or gain adjusting volume unless the alteration is detected at substep S9.

The R color signal displaying routine L4 includes a substep S10 for lighting the light emitting diode LED1 for one second upon detecting the alteration in the output at the substep S9, a substep S11 for increasing the lighting time T of the light emitting diode LED1, and a substep S12 for deciding whether the increased count value of the lighting time T becomes 3.

Next, the B color signal adjusting step P3 is performed via substeps S13,S14,S16,S17, S23 and substeps S15,S18 in the same manner as described with respect to the R color signal adjusting step P2.

The gain adjustment preparing step P4 for carrying out a gain adjustment, after the adjustment of the B color signal pedestal level at the B color signal adjusting step P3, includes a substep S19 for setting lens flag to "0" and opening the lens 100, a substep S20 for confirming whether the lens has been opened after the execution of the substep S19, and a substep S21 for producing an alarm upon finding that the lens has not opened. If the lens 100 has been opened as a result of the execution of the substep S20, the pedestal preparatory routine L2 is preformed again from the substep S6.

In summary, if a system is put under into an inspection mode by connecting a switch 1 of the comparing circuit 10 to a contact point a, the R or B color signals input through the switch 1 are compared with separate G color signals and the logical value of the compared signals is provided to a MICOM 20, thereby their pedestal level or gain can be adjusted. Under this condition, an output operating logic "H" signal indicating adjustment of the pedestal level or the gain by the MICOM 20 is provided to a transistor TR1 of a display circuit 30. As a result, the transistor TR1 is turned on, thereby lighting the light emitting diode LED1.

The three timed lightings of the light emitting diode LED1 indicates the completion of the adjustment of the pedestal level and the gain.

The method according to the present invention is described in more detail while referring to FIG. 2. First, a decision is made as to whether an inspection mode is established by a discriminating substep S1 of an initial routine L1, and upon recognizing the setting of an inspection mode, the lens flag is set to "1" in the MICOM 20 by a substep S2 and the lens 100 is closed. When it is realized that the lens 100 has been closed by a discriminating substep S4 of a pedestal preparatory routine L2, an R color signal comparing routine L3 of an R color signal adjusting step P2 is carried out, but in the opposite case, an alarm signal is output during a substep S5.

In other words, if it is found that the lens 100 has been closed, the counter T for counting the lightings of the light emitting diode LED 1 is set to "0" by a substep S6 of a R color signal comparing routine L3, and, after the execution of the substep S6, "RSET" in the MICOM 20 is set to "1" by the substep S7.

It should be noted that if "RSET" is set to "0", B color signals are selected, so that the pedestal level and gain of the B color signals can be adjusted.

After the execution of the substep S7, the R color signals and the G color signals (as the reference signals) are compared with each other by the comparator 2 and the result of comparison is outputted by a substep S8. Then, it is determined whether the reference signals have been altered during the adjustment of the R color signals by a substep S9. If the output signals have been altered, the light emitting diode LED1 is lighted for 1 second by a substep S10 of an R color signal display routine L4.

If the output signals have not been altered, the control of pedestal or gain adjusting volume is continued by a substep 22. The lighting times T of the light emitting diode LED1 is then increased by a substep S11, and it is checked whether the value T becomes 3 by a substep 12. If the value is 3, the adjustment of the pedestal level of the R color signals is complete.

Meanwhile, after the completion of the adjustment of the pedestal level of the R color signals, "RSET" in the MICOM 20, is set to "0", and B color signals are selected as the signals by a substep S13 of a B color signal comparing routine L5 of the B color signal adjusting step P3. The adjustment of the pedestal level of the B color signals is then carried out by the B color signal displaying routine L6 and the B color signal comparing routine L5 in the same manner as the R color signal comparing routine L3 and the R color signal displaying routine L4.

After the execution of the B color signal adjusting step P3 and the completion of the adjustment of the pedestal level, the lens flag is set to "0" in the MICOM 20 by the substep S19 of a gain adjustment preparing step P4, to indicate that the lens 100 should be opened.

After the execution of the substep S19, it is checked whether the lens 100 has been opened by a discriminating substep S20. If the lens 100 is still closed, an alarm signal is output by a substep S21.

After the completion of the gain adjustment preparing step P4, the gain is also adjusted by repeating the R color signal adjusting step P2 and the B color signal adjusting step P3.

According to the present invention as described above, the R color signals or B color signals are compared with G color signals (as the reference signals), whereby the pedestal level and gain are adjusted with respect to the compared signals. As a result, adjustment of the pedestal level and gain can be performed simply and conveniently without requiring a separate apparatus.

The present invention is in no way limited to the embodiment described hereinabove. Various modifications of the disclosed embodiment of the present invention will become apparent to persons skilled in the art upon reference to the description of the present invention. Therefore, the appended claims will cover any such modifications or embodiments that fall within the true scope of the present invention.

What is claimed is:

1. A control method for a video signal gain adjusting apparatus in a video signal processing system, said method comprising the steps of:
   (a) controlling a lens so as to make said lens closed in response to selection of an inspection mode;
   (b) adjusting and displaying R color signals after the execution of said controlling step;
   (c) adjusting and displaying B color signals after the execution of said adjusting step (b); and
   (d) controlling said lens so as to make said lens opened for adjusting the gain after execution of said adjusting step (c).

2. The control method according to claim 1, wherein said step (a) comprises the steps of:

(e) setting a value corresponding to a desired position of a lens to "1"; and (f) positioning said lens to said desired position, said desired position being a closed position after execution of said step (e).

3. The control method according to claim 2, wherein said step (f) comprises the steps of:

(g) discriminating whether said lens has been closed after the execution of said step (e); and (h) outputting an alarm signal when said lens has not been closed at said step (g).

4. The control method according to claim 1, wherein said step (b) comprises the steps of:

(i) when said lens is in a closed position, comparing said R color signals with G color signals and outputting the compared signals; and (j) after execution of step (i), displaying an indication corresponding to an adjusted state.

5. The control method according to claim 4, wherein said step (i) comprises the steps of:

(k) initializing a counter for counting the number of times a light emitting diode has been lighted;

(l) setting a variable "RESET" to "1" in a microcomputer to thereby select said R color signals for adjustment after execution of said step (k);

(m) comparing said R color signals with said G color signals and outputting the compared signals after execution of said step (l); and (n) discriminating whether said compared signals have been altered as a result of the adjustment of said R color signals.

6. The control method according to claim 4, wherein said step (j) comprises the steps of:

(o) lighting a light emitting diode for one second upon finding an alteration in said compared signals;

(p) increasing a time period corresponding to the lighting time of said light emitting diode; and (q) discriminating whether said time period is 3 at the completion of said step (p).

7. A control method for a video signal gain adjusting apparatus in a video signal processing system, said method comprising the steps of:

(a) determining a state of a switch connecting R color signals and B color signals to a comparator means for comparing a selected one of said R color and B color signals with separately supplied G color signals;

(b) controlling a lens so as to close said lens based on said state of said switch;

(c) adjusting a selected one of pedestal level and gain of said R color signals and displaying indications corresponding to adjustment state of said R color signals;

(d) adjusting said selected one of said pedestal level and gain of said B color signals and displaying indications corresponding to adjustment condition of said B color signals;

(e) controlling said lens so as to open said lens; and (f) repeating said steps (c) and (d) so as to adjust the other of said pedestal level and gain of said R color and B color signals.

8. The method of claim 7, wherein said adjusting step (c) further comprises the step (g) of determining whether said R color signals and said G color signals have changed with respect to one another.

9. The method of claim 7, wherein said adjusting step (d) further comprises the step (h) of determining whether said B color signals and said G color signals have changed with respect to one another.

* * * * *